UNITED STATES PATENT OFFICE.

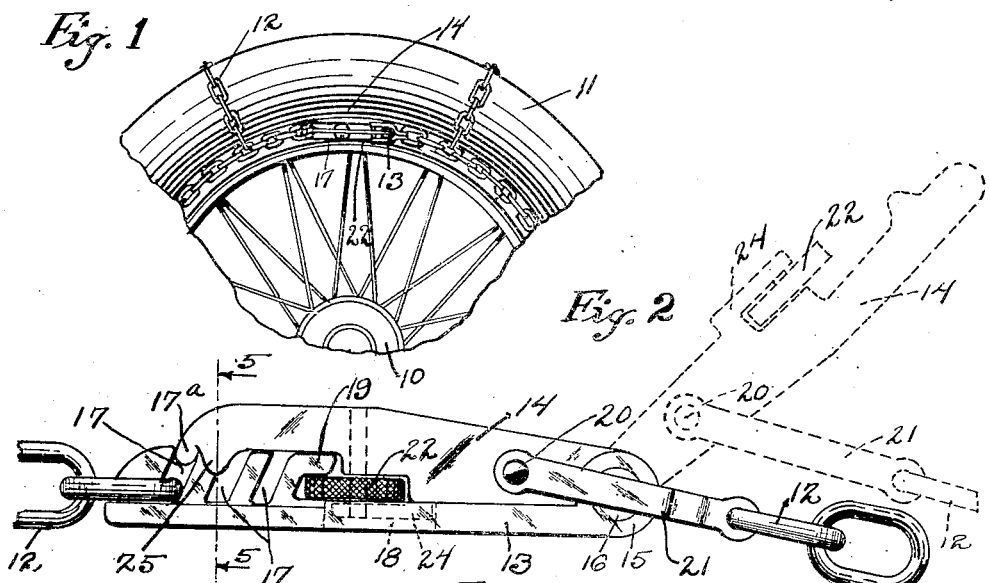

LENOARD VERNON UGLOW, OF BENTON, IOWA.

CHAIN-TIGHTENER DEVICE.

1,337,534.    Specification of Letters Patent.    Patented Apr. 20, 1920.

Application filed November 20, 1919. Serial No. 339,475.

*To all whom it may concern:*

Be it known that I, LENOARD VERNON UGLOW, a citizen of the United States, and a resident of Benton, in the county of Ringgold and State of Iowa, have invented a certain new and useful Chain-Tightener Device, of which the following is a specification.

My invention relates to a device adapted for drawing the two ends of a non-skid chain together and locking means for holding them together.

The device is very simple and can readily be attached to any make of non-skid chains, and is inexpensive in construction and very durable.

A further object of my invention is to provide a chain tightener, comprising a base having means thereon for detachably securing the base to one end of a non-skid chain, and a hinged member on said base, which has means thereon for fastening it to the other end of the non-skid chain.

Still a further object is to provide a chain tightener which is adapted to be secured to the ends of a non-skid chain whereby movement of a portion of said device will draw the ends of the chain together, and means for locking the device in such position that the ends will remain in their tightened position.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of a portion of an automobile wheel, having a non-skid chain thereon with my improved chain tightener attached thereto.

Fig. 2 shows an enlarged side elevation of my improved device with the hinged member shown in dotted lines.

Fig. 3 shows a top elevation, the hinged member being shown in its open position.

Fig. 4 shows a top view of the hinged member; and

Fig. 5 shows a sectional view on the line 5—5 of Fig. 2.

In the accompanying drawings, I have used the reference numeral 10 to indicate the ordinary automobile wheel, having a tire or casing 11 thereon. Mounted on the casing 11 is a non-skid chain 12.

My device comprises a base member 13 and a hinged member 14. The base 13 is provided with upwardly extending ears 15, through which is extended the pintle 16. At the opposite end of the base 13, I provide a series of notches 17, which are designed to selectively receive one end of the non-skid chain 12.

The base 13 is provided with an elongated slot 18, the purpose of which will be more fully set forth. Slightly overlapping the slot 18 is a hook member 19. The hinged member 14 is provided with a pin 20, to which is fastened the link 21. The link 21 is designed to be secured to one end of the chain 12.

Rotatably mounted on the hinged member 14 is a disk 22, having a notch 23 therein. The hinged member 14 is provided with a projecting portion 24, which is designed to be received in the slot 18 of the base 13 when the hinged member is in its locked or locking position.

Spaced ears 25 are provided near the forward end of the hinged member and are adapted to extend over the sides of a portion of the base 13, thus preventing any sidewise movement of the hinged member relative to the base.

When the hinged member 14 is in its locked position, it is adapted to extend over the series of notches 17 and adapted to have a portion 17ª extend into the forward one of said notches, and thus prevent any possible way for the chain 12 from becoming detached from the fastener without first lifting or swinging the hinged member to the position shown in dotted lines in Fig. 2.

The notch 23 in the disk 22 will permit the disk to pass over the hook member 19, and this is done by rotating the disk member 22 not quite a complete revolution, which will cause the upper portion of the hook 19 and the notch 23 to be in such position that they will not register with each other, and thus prevent the hinged member from being removed relative to the base, thus forming a positive lock for holding the ends of the chain in their tightened position.

When it is desired to remove the chains, the disk member is rotated until the notch 23 registers with the overhanging portion of the hook 19. When the disk is in this position, it will be seen that the hinged member may be swung to the position shown in dotted lines in Fig. 2, thus loosening the chain to such an extent, that it will be easy to disengage the chain from the notches 17, thus making it very easy to remove the chain.

When it is desired to place the chain in position on the casing 11, the hinged member is left in its open position, so that the end of the chain 12 may be placed in one of the notches 17. Then by moving the hinged member to its locking position, it will draw the ends of the chain until the chain fits absolutely tight around the casing 11; then by rotating the disk 22 will lock the device against any accidental movement.

Some changes may be made in the construction and arrangement of the various parts of my improved device, without departing from the essential spirit and purpose of my invention, and it is my purpose to cover by my claims any modified forms of structure or use of mechanical equivalents, which may be reasonably included within the scope of my claims.

I claim as my invention:

1. In a device of the class described, a base, a hinged member mounted on said base, a plurality of notches formed on one end of said base designed to selectively receive one end of a non-skid chain, a link pivoted to said hinged member and adapted to be secured to the free end of a non-skid chain, a hook member formed on said base, a disk having a notch therein rotatably mounted on said hinged member, said disk when in one position will permit said notch to pass over said hook member, when the hinged member is being swung to locking position, and whereby rotation of said disk after the hinged member is in locking position will cause the notch to be out of register with the hook member, and thereby prevent any movement of said hinged member relative to said base.

2. In a device of the class described, a base having a slot formed therein, a hinged member mounted on said base, a plurality of notches formed on one end of said base designed to selectively receive one end of a non-skid chain, a link pivoted to said hinged member and adapted to be secured to the free end of a non-skid chain, a hook member formed in said base and adapted to partially overhang said slot, a disk having a notch therein rotatably mounted on said hinged member, a projecting portion formed on said hinged member designed to be received in said slot when the hinged member is in its locking position, to prevent any sidewise movement of said hinged member relative to said base, said disk when in one position will cause the notch in said disk to register with said hook, thereby permitting said disk to pass over said hook member when the hinged member is being swung to locking position, and whereby rotation of said disk after the hinged member is in locking position will cause said notch and hook member to be out of register and thereby lock said hinged member relative to said base.

Des Moines, Iowa, November 6, 1919.

LENOARD VERNON UGLOW.